(12) United States Patent
Ohtake et al.

(10) Patent No.: US 7,177,071 B2
(45) Date of Patent: Feb. 13, 2007

(54) SEMICONDUCTOR CRYSTAL FOR GENERATING TERAHERTZ WAVES, TERAHERTZ WAVE-GENERATOR INCORPORATING THE CRYSTAL, SEMICONDUCTOR CRYSTAL FOR DETECTING TERAHERTZ WAVES, AND TERAHERTZ WAVES DETECTOR INCORPORATING THE CRYSTAL

(75) Inventors: Hideyuki Ohtake, Kariya (JP); Toshiharu Sugiura, Tokoname (JP); Toshiaki Bessho, Nagoya (JP); Koichiro Tanaka, Souraku-gun (JP); Masaya Nagai, Kyoto (JP); Yutaka Kadoya, Higashihiroshima (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 11/132,411

(22) Filed: May 19, 2005

(65) Prior Publication Data
US 2005/0258368 A1 Nov. 24, 2005

(30) Foreign Application Priority Data
May 19, 2004 (JP) ............................. 2004-149576

(51) Int. Cl.
*G02F 1/355* (2006.01)
*H01S 5/323* (2006.01)

(52) U.S. Cl. .................................... 359/326; 372/43.01
(58) Field of Classification Search ........ 359/326–332; 372/43.01
See application file for complete search history.

(56) References Cited

U.S. PATENT DOCUMENTS

| 5,355,247 | A | 10/1994 | Byer et al. ................... 359/330 |
|---|---|---|---|
| 6,414,473 | B1 * | 7/2002 | Zhang et al. .................. 324/96 |
| 6,573,700 | B2 * | 6/2003 | Zhang et al. .................. 324/96 |
| 6,605,808 | B2 * | 8/2003 | Mickan et al. ........... 250/341.8 |
| 6,697,186 | B2 | 2/2004 | Kawase et al. ............. 359/330 |
| 2002/0153874 | A1 | 10/2002 | Jiang et al. .................... 324/96 |
| 2002/0158260 | A1 | 10/2002 | Yamamoto et al. ........... 257/79 |

OTHER PUBLICATIONS

Jib Shan, et al., "Terahertz time-domain spectroscopy based on nonlinear optics", Journal Nonlinear Optical Physics & Materials, vol. 11, No. 1, 2002, pp. 31-48.
M. Li, et al., "THz generation and detection using 1550-nm pulses from a fiber laser", Conference on Lasers and Electro-Optics, vol. 39, XP-001023056, May 11, 2000, pp. 559-560.

* cited by examiner

*Primary Examiner*—John D. Lee
(74) *Attorney, Agent, or Firm*—Oblon, Spivak, McClelland, Maier & Neustadt, P.C.

(57) ABSTRACT

A terahertz wave-generating semiconductor crystal includes a zincblende-type III-V compound semiconductor crystal that generates terahertz wave pulses upon application of an ultrashort light pulse in the optical communication band serving as a pump beam.

4 Claims, 6 Drawing Sheets

SEMICONDUCTOR CRYSTAL FOR GENERATING TERAHERTZ WAVES, TERAHERTZ WAVE-GENERATOR INCORPORATING THE CRYSTAL, SEMICONDUCTOR CRYSTAL FOR DETECTING TERAHERTZ WAVES, AND TERAHERTZ WAVES DETECTOR INCORPORATING THE CRYSTAL

CROSS REFERENCE TO RELATED APPLICATIONS

This application is based on and claims priority under 35 U.S.C. §119 with respect to a Japanese Patent Application 2004-149576, filed on May 19, 2004, the entire content of which is incorporated herein by reference.

BACKGROUND OF THE INVENTION

1. Field of the Invention

The present invention relates to semiconductor crystals for generating terahertz waves, terahertz wave generators incorporating the semiconductor crystals, semiconductor crystals for detecting terahertz waves, and terahertz wave detectors incorporating the semiconductor crystals.

2. Description of the Related Art

Terahertz waves are electromagnetic waves having a frequency in the range of 0.1 to 10 THz (wavelength: 30 to 3,000 μm) and their wavelength substantially overlaps infrared and far-infrared regions. The terahertz region ranging from 0.1 to 10 THz has not been extensively explored in the past. Recently, studies are being conducted to apply the electromagnetic waves in this region to environmental instrumentation such as imaging or tomography, biology, and medical science, and the terahertz waves are thus increasingly gaining importance. In order to expand the applications of the terahertz waves, efficient generation and detection of terahertz waves are indispensable. The present invention relates to semiconductor crystals for generating terahertz waves, terahertz wave generators incorporating the semiconductor crystals, methods for generating terahertz waves using the semiconductor crystals, terahertz wave detectors incorporating the semiconductor crystals, and methods for detecting terahertz waves using the semiconductor crystals.

As the methods for generating terahertz waves, a difference frequency generation technique using a parametric element, a parametric oscillator generation technique using a nonlinear element, a generation technique using a crystal having electro-optic effects (hereinafter referred to as "EO effects"), and the like have been available. Among these techniques, the technique of generating terahertz waves by utilizing the EO effects advantageously has high practicality since the technique allows easy optical alignment.

As the devices for detecting terahertz waves, bolometers, optically conductive antennas, those that utilize electro-optical (EO) effects, such as ZnTe, etc., have been available. Among these, optically conductive antennas and devices that utilize the EO effects are widely used since they do not require cooling of elements and yet achieve relatively high detection efficiency.

As the method for generating and detecting terahertz waves by using ZnTe crystals that exhibit EO effects, a technique developed by J. Shan et al. (J. Shan, A. Nahata, and T. Heinz, "Terahertz time-domain spectroscopy based on nonlinear optics", J. Nonlinear Optical Physics and Material, Vol. 11, 2002, pp. 31–48) has been known in the art. According to this technique, terahertz waves are generated by pumping ZnTe with ultrashort light pulses of 0.8 μm and are detected by sampling terahertz waves incident on ZnTe with ultrashort light pulses of 0.8 μm. Terahertz waves can be generated and detected with ZnTe and 0.8 μm ultrashort light pulses because the interactive length that allows phase matching in ZnTe Is relatively large between 0.8 μm ultrashort light pulses and terahertz wave pulses. The interactive length that allows phase matching is hereinafter also referred to as "coherent length".

However, 0.8 μm ultrashort light pulses are generated by a large-scale Ti:sapphire laser system in a free space and are thus rarely applicable to optical communication fibers. Moreover, the device that generates and detects terahertz waves is also large and requires complicated optical alignment. Furthermore, in order to generate and detect terahertz waves using ZnTe and ultrashort light pulses of 1 to 2 μm in the optical communication band, the thickness of ZnTe must be reduced to 100 μm or less to achieve phase matching. Thus, it has been difficult to ensure effective coherent lengths to achieve high generation and detection efficiencies. In other words, crystals having EO effects that can highly efficiently generate and detect terahertz waves using ultrashort light pulses in the optical communication band have not been known in the art.

SUMMARY OF THE INVENTION

An object of the invention is to provide a crystal having EO effects that can highly efficiently generate and detect terahertz waves using ultrashort light pulses in the optical communication band. Terahertz wave generator incorporating the crystal, a method for generating terahertz waves using the crystal, a terahertz wave detector incorporating the crystal, and a method for detecting terahertz waves using the crystal are also provided.

To achieve object, an aspect of the present invention provides a terahertz wave-generating semiconductor crystal including a zincblende-type III-V compound semiconductor crystal that generates terahertz wave pulses upon application of an ultrashort light pulse in the optical communication band serving as a pump beam.

The zincblende-type III-V compound semiconductor crystal has a large interactive length (coherent length) in which phase matching is achieved between the ultrashort light pulses in the optical communication band and the terahertz wave pulses. Thus, terahertz waves can be highly efficiently generated by using the ultrashort light pulses in the optical communication band as the pump beam.

The zincblende-type III-V compound semiconductor crystal is preferably one selected from the group consisting of GaAs, InGaAs, InGaAsP, InAlAs, InP, GaP, GaSb, and AlSb crystals. These crystals are transparent in the optical communication band and thus can highly efficiently generate terahertz waves with a smaller absorption loss of the pump beam.

The zincblende-type III-V compound semiconductor crystal is preferably a quasi-phase matching crystal. The quasi-phase matching crystal can increase the substantial interactive length and can thus generate terahertz waves in a high bandwidth at high efficiency.

The quasi-phase matching crystal may be constituted from layers of a first semiconductor crystal (P) and a second semiconductor crystal (N) alternately stacked on each other, the first semiconductor crystal having a group index at the wavelength of the pump beam greater than the refractive index at the wavelength of the terahertz waves, the second semiconductor crystal having a group index at the wavelength of the pump beam smaller than the refractive index at the wavelength of the terahertz waves.

Such a quasi-phase matching crystal can be easily produced by a semiconductor crystal film production technique such as metalorganic chemical vapor deposition (MOCVD), molecular beam epitaxy (MBE), or the like.

The semiconductor crystals (P) and (N) are preferably one selected from the group consisting of GaAs, InGaAs, InGaAsP, InAlAs, InP, GaP, GaSb, and AlSb crystals. These crystals are transparent in the optical communication band and thus can highly efficiently generate terahertz waves with smaller absorption loss of the pump beam.

Another aspect of the invention provides a terahertz wave generator including a light source for generating a pump beam which is an ultrashort light pulse in the optical communication band; and a terahertz wave-generating semiconductor crystal comprising a zincblende-type III-V compound semiconductor crystal that has a predetermined thickness and generates terahertz wave pulses upon application of the pump beam generated from the light source.

The zincblende-type III-V compound semiconductor crystal has a large interactive length (coherent length) in which phase matching is achieved between the ultrashort light pulses in the optical communication band and the terahertz wave pulses. Thus, terahertz waves can be highly efficiently generated by using the ultrashort light pulses in the optical communication band as the pump beam.

The zincblende-type III-V compound semiconductor crystal is preferably one selected from the group consisting of GaAs, InGaAs, InGaAsP, InAlAs, InP, GaP, GaSb, and AlSb crystals. These crystals are transparent in the optical communication band and thus can highly efficiently generate terahertz waves with smaller absorption loss of the pump beam.

The zincblende-type III-V compound semiconductor crystal is preferably a quasi-phase matching crystal. The quasi-phase matching crystal can increase the substantial interactive length and can thus generate terahertz waves in a high bandwidth at high efficiency.

Preferably, the quasi-phase matching crystal is constituted from layers of a first semiconductor crystal (P) and a second semiconductor crystal (N) alternately stacked on each other, the first semiconductor crystal having a group index at the wavelength of the pump beam larger than the refractive index at the wavelength of the terahertz waves, the second semiconductor crystal having a group index at the wavelength of the pump beam smaller than the refractive index at the wavelength of the terahertz waves.

Such a quasi-phase matching crystal can be easily produced by a semiconductor crystal film production technique such as metalorganic chemical vapor deposition (MOCVD), molecular beam epitaxy (MBE), or the like.

The semiconductor crystals (P) and (N) are preferably one selected from the group consisting of GaAs, InGaAs, InGaAsP, InAlAs, InP, GaP, GaSb, and AlSb crystals. These crystals are transparent in the optical communication band and thus can highly efficiently generate terahertz waves with smaller absorption loss of the pump beam.

The light source may be a fiber laser including an Er- or Yb-doped fiber serving as a gain medium.

The thickness of the semiconductor crystal may be adjusted to generate terahertz wave pulses of a particular wavelength. By setting the thickness to the local minimum of the coherent length curve, terahertz waves having a wavelength that satisfies that coherent length can be generated.

Another aspect of the present invention provides a terahertz wave-detecting semiconductor crystal including a zincblende-type III-V compound semiconductor crystal that emits a modified sampling beam modified with an electrical field signal of a terahertz wave pulse upon temporal and spatial overlap irradiation with the terahertz wave pulse and an ultrashort light pulse in the optical communication band serving as a sampling beam.

The zincblende-type III-V compound semiconductor crystal has a large interactive length (coherent length) in which phase matching is achieved between the ultrashort light pulses in the optical communication band and the terahertz wave pulses. Thus, terahertz waves can be highly efficiently detected by using the ultrashort light pulses in the optical communication band as the sampling beam.

The zincblende-type III-V compound semiconductor crystal is preferably one selected from the group consisting of GaAs, InGaAs, InGaAsP, InAlAs, InP, GaP, GaSb, and AlSb crystals. These crystals are transparent in the optical communication band and thus can highly efficiently detect terahertz waves with a, smaller absorption loss of the sampling beam.

The zincblende-type III-V compound semiconductor crystal is preferably a quasi-phase matching crystal. The quasi-phase matching crystal can increase the substantial interactive length and can thus detect terahertz waves in a high bandwidth at high efficiency.

The quasi-phase matching crystal may be constituted from layers of a first semiconductor crystal (P') and a second semiconductor crystal (N') alternately stacked on each other, the first semiconductor crystal having a group index at the wavelength of the sampling beam greater than the refractive index at the wavelength of the terahertz waves, the second semiconductor crystal having a group index at the wavelength of the sampling beam smaller than the refractive index at the wavelength of the terahertz waves.

Such a quasi-phase matching crystal can be easily produced by a semiconductor crystal film production technique such as metalorganic chemical vapor deposition (MOCVD), molecular beam epitaxy (MBE), or the like.

The semiconductor crystals (P') and (N') are preferably one selected from the group consisting of GaAs, InGaAs, InGaAsP, InAlAs, InP, GaP, GaSb, and AlSb crystals. These crystals are transparent in the optical communication band and thus can highly efficiently detect terahertz waves with a smaller absorption loss of the sampling beam.

Another aspect of the invention provides a terahertz wave detector including a terahertz wave-detecting semiconductor crystal comprising a zincblende-type III-V compound semiconductor crystal that emits a modified sampling beam modified with an electrical field signal of a terahertz wave pulse upon temporally and spatial overlap irradiation with the terahertz wave pulse and an ultrashort light pulse in the optical communication band serving as a sampling beam; an irradiation unit that applies the terahertz wave pulse and the sampling beam to the zincblende-type III-V compound semiconductor crystal so that the terahertz wave pulse and the sampling beam temporary and spatially overlap each other; and an optical detector for detecting the sampling beam modified by an electrical field signal of the terahertz wave pulse and emitted from the zincblende-type III-V compound semiconductor crystal.

The zincblende-type III-V compound semiconductor crystal has a large interactive length (coherent length) in which phase matching is achieved between the ultrashort light pulses in the optical communication band and the terahertz wave pulses. Thus, terahertz waves can be highly efficiently detected by using the ultrashort light pulses in the optical communication band as the sampling beam.

The zincblende-type III-V compound semiconductor crystal is preferably one selected from the group consisting of GaAs, InGaAs, InGaAsP, InAlAs, InP, GaP, GaSb, and AlSb crystals. These crystals are transparent in the optical communication band and thus can highly efficiently detect terahertz waves with a smaller absorption loss of the sampling beam.

The zincblende-type III-V compound semiconductor crystal is preferably a quasi-phase matching crystal. The quasi-phase matching crystal can increase the substantial interactive length and can thus detect terahertz waves in a high bandwidth at high efficiency.

The quasi-phase matching crystal may be constituted from layers of a first semiconductor crystal (P') and a second semiconductor crystal (N') alternately stacked on each other, the first semiconductor crystal having a group index at the wavelength of the sampling beam greater than the refractive index at the wavelength of the terahertz waves, the second semiconductor crystal having a group index at the wavelength of the sampling beam smaller than the refractive index at the wavelength of the terahertz waves.

Such a quasi-phase matching crystal can be easily produced by a semiconductor crystal film production technique such as metalorganic chemical vapor deposition (MOCVD), molecular beam epitaxy (MBE), or the like.

The terahertz wave detector may further include a light source that generates the ultrashort light pulse in the optical communication band; a splitter that splits the ultrashort light pulse into a pump beam and the sampling beam, and a terahertz wave-generating semiconductor crystal comprising a zincblende-type III-V compound semiconductor crystal that has a predetermined thickness and generates the terahertz wave pulse upon irradiation with the pump beam. The irradiation unit applies both of the terahertz wave pulse generated from the terahertz wave-generating semiconductor crystal and the sampling beam to the terahertz wave-detecting semiconductor crystal.

The light source may be a fiber laser including an Er- or Yb-doped fiber serving as a gain medium.

The zincblende-type III-V compound semiconductor crystal may be a quasi-phase matching crystal comprising layers of a first semiconductor crystal and a second semiconductor crystal alternately stacked on each other, the first semiconductor crystal having a group index at the wavelength of the pump beam larger than the refractive index at the wavelength of the terahertz waves and, the second semiconductor crystal having a group index at the wavelength of the pump beam smaller than the refractive index at the wavelength of the terahertz waves. Furthermore, each of the first and second semiconductor crystal may be one selected from the group consisting of GaAs, InGaAs, InGaAsP, InAlAs, InP, GaP, GaSb, and AlSb crystals.

Another aspect of the invention provides a method for generating terahertz waves at high efficiency, the method including a pump beam-generating step of generating an ultrashort light pulse in the optical communication band serving as a pump beam; and an irradiation/generation step of applying the pump beam to a zincblende-type III-V compound semiconductor crystal having a predetermined thickness to generate a terahertz wave pulse.

The zincblende-type III-V compound semiconductor crystal is preferably a quasi-phase matching crystal and is preferably one selected from the group consisting of GaAs, InGaAs, InGaAsP, InAlAs, InP, GaP, GaSb, and AlSb crystals.

Preferably, the quasi-phase matching crystal is constituted from layers of a first semiconductor crystal (P) and a second semiconductor crystal (N) alternately stacked on each other, the first semiconductor crystal having a group index at the wavelength of the pump beam larger than the refractive index at the wavelength of the terahertz waves, the second semiconductor crystal having a group index at the wavelength of the pump beam smaller than the refractive index at the wavelength of the terahertz waves.

The semiconductor crystals (P) and (N) are preferably one selected from the group consisting of GaAs, InGaAs, InGaAsP, InAlAs, InP, GaP, GaSb, and AlSb crystals.

The thickness of the semiconductor crystal may be adjusted to generate terahertz wave pulses of a particular wavelength.

Yet another aspect of the present invention provides a method for highly efficiently detecting terahertz waves, the method including a step of temporal and spatial overlap irradiation of a zincblende-type III-V compound semiconductor crystal with a terahertz wave pulse and an ultrashort light pulse in the optical communication band serving as a sampling beam so that the sampling beam modified with an electrical field signal of the terahertz wave is emitted from the zincblende-type III-V compound semiconductor crystal.

The zincblende-type III-V compound semiconductor crystal is preferably a quasi-phase matching crystal and is preferably one selected from the group consisting of GaAs, InGaAs, InGaAsP, InAlAs, InP, GaP, GaSb, and AlSb crystals.

Preferably, the quasi-phase matching crystal is constituted from layers of a first semiconductor crystal (P') and a second semiconductor crystal (N') alternately stacked on each other, the first semiconductor crystal having a group index at the wavelength of the pump beam larger than the refractive index at the wavelength of the terahertz waves, the second semiconductor crystal having a group index at the wavelength of the pump beam smaller than the refractive index at the wavelength of the terahertz waves.

The semiconductor crystals (P') and (N') are preferably one selected from the group consisting of GaAs, InGaAs, InGaAsP, InAlAs, InP, GaP, GaSb, and AlSb crystals.

DESCRIPTION OF THE PREFERRED EMBODIMENTS

Figure 1:
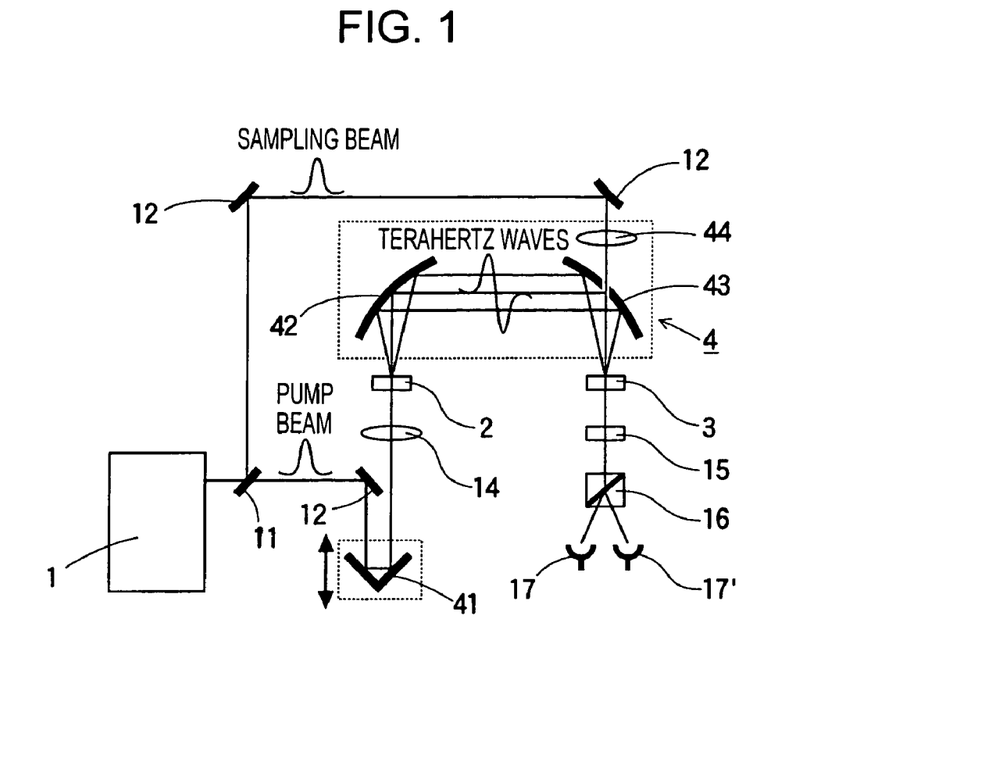
FIG. 1 is an outline diagram showing a terahertz wave generation/detection system including an inventive high-efficiency terahertz wave generator and an inventive high-efficiency terahertz wave detector.

The preferred embodiments of the present invention will now be described with reference to the attached drawings. FIG. 1 is an outline diagram showing a terahertz wave generation/detection system including an inventive high-efficiency terahertz wave generator and an inventive high-efficiency terahertz wave detector. Ultrashort light pulses in the optical communication band generated from a light source 1 are split into a pump beam and a sampling beam using a beam splitter 11 serving as a splitter.

The terahertz wave generator includes the light source 1 and a zincblende-type III-V compound semiconductor crystal 2 that has a predetermined thickness and generates terahertz waves when the pump beam concentrated with a lens 14 is applied. The terahertz wave detector includes a zincblende-type III-V compound semiconductor crystal 3 and an overlap irradiation unit 4 that apply terahertz waves and the sampling beam to the zincblende-type III-V compound semiconductor crystal 3 so that the terahertz waves temporally and spatially overlap the sampling beam.

An example of the light source 1 for generating ultrashort light pulses in the optical. communication band is a femtosecond fiber laser including a gain medium composed of a fiber doped with a rare-earth element such as Er or Yb. In particular, FEMTOLITE produced by Aisin Seiki Co., Ltd. is preferable. There are various modified models of FEMTOLITE that generate femtosecond pulses 1.04, μm, 1.22 μm and 1.56–1.90 μm in wavelength.

The zincblende-type III-V compound semiconductor crystal 2 will be described later together with the zincblende-type III-V compound semiconductor crystal 3 of the terahertz wave detector.

An example of the overlap irradiation unit 4 is shown in FIG. 1. The overlap irradiation unit 4 include an optical delay line 41 for applying the sampling beam and the terahertz waves to the zincblende-type III-V compound semiconductor crystal 3 so that the terahertz waves temporally overlap the sampling beam; an off-axis parabolic mirror 42 that concentrates and collimates the terahertz waves generated from the semiconductor crystal 2; a perforated off-axis parabolic mirror 43 that concentrates the collimated terahertz waves and applies the concentrated collimated terahertz waves to the zincblende-type III-V compound semiconductor crystal 3; and a lens 44 that concentrates the sampling beam and applies the concentrated sampling beam to the zincblende-type III-V compound semiconductor crystal 3 through a hole formed in the perforated off-axis parabolic mirror 43 so that the same position of the semiconductor crystal 3 is irradiated with the terahertz waves and the sampling beam.

The system also includes optical path bending mirrors 12, a quarter wavelength plate 15, a Wollaston prism 16, and InGaAs optical detectors 17 and 17'.

Next, the zincblende-type III-V compound semiconductor crystals 2 and 3 are described. The zincblende-type III-V compound semiconductor crystals 2 and 3 are preferably composed of one selected from GaAs, InGaAs, InGaAsP, InAlAs, InP, GaP, GaSb, and AlSb, which is transparent in the optical communication band. In order to generate and detect terahertz waves with these crystals, the phase matching between the pump beam and the generated terahertz waves and the phase matching between the sampling beam and the terahertz waves to be detected must be achieved. Furthermore, the interactive length (coherent length) for phase matching must be large enough to generate and detect terahertz waves at high efficiencies.

The coherent length lc can be given as a function of the wavelength λps of the pump or sampling beam and the frequency f of the terahertz waves:

$$lc = c/2f|n_{THz} - n_g| \quad (1)$$

wherein c denotes speed of light, $n_{THz}$ denotes a refractive index in the terahertz region, and $n_g = nps - \lambda ps \partial nps/\partial \lambda ps$ and denotes a group index of optical pulses having a refractive index of nps for the pump or sampling beam.

The refractive index nps at a bandgap energy of 1.43 eV or less is given by:

$$n^2 ps = A + B\lambda^2 ps/(\lambda^2 ps - C^2) \quad (2)$$

wherein parameter A is 8.950, B is 2.054, and $C^2$ is 0.390 μm².

The refractive index at the terahertz region (far-infrared region) is given by a simple Lorentz resonance model:

$$n^2 THz = \epsilon\infty + f^2 1(\epsilon 0 + \epsilon\infty)/(f^2 1 - f^2 - \gamma f^2) \quad (3)$$

wherein parameter f1=237.3 cm⁻¹, γ/f1=0.007, ε∞=10.90, and ε∞−ε0=2.0.

Figure 2:
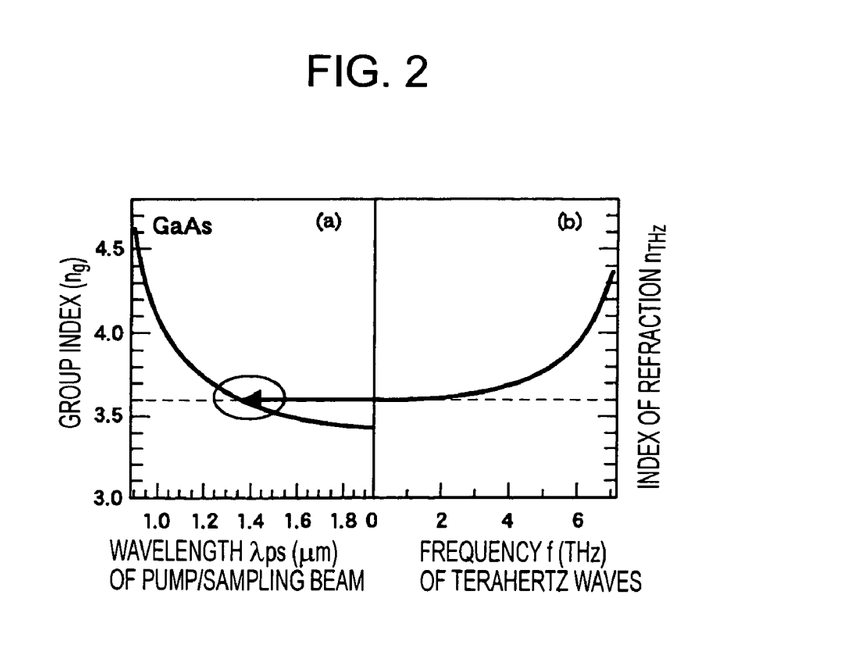
FIG. 2 includes a graph showing a dispersion curve of a group index $n_g$ of GaAs for a pump or sampling beam and a graph showing a dispersion curve of a refractive index $n_{THz}$ of GaAs in the terahertz region.
Figure 3:
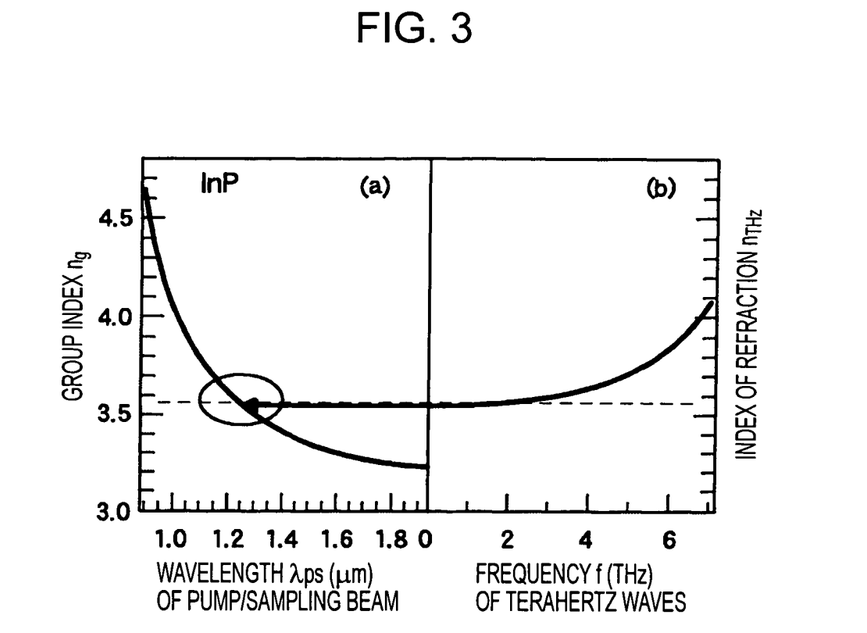
FIG. 3 includes a graph showing a dispersion curve of a group index $n_g$ of InP for a pump or sampling beam and a graph showing a dispersion curve of a refractive index $n_{THz}$ of InP in the terahertz region.
Figure 4:
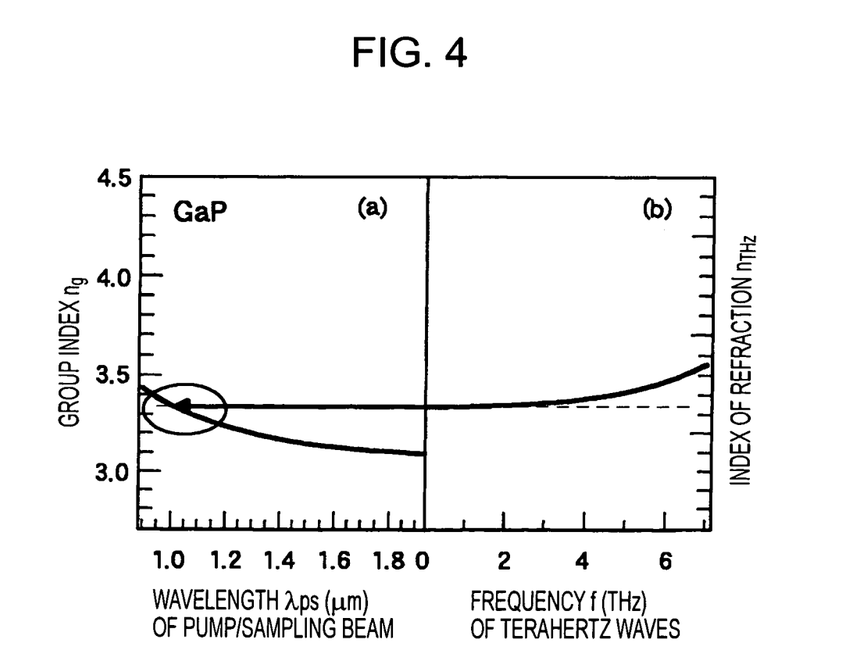
FIG. 4 includes a graph showing a dispersion curve of a group index $n_g$ of GaP for a pump or sampling beam and a graph showing a dispersion curve of a refractive index $n_{THz}$ of GaP in the terahertz region.

Among the preferable materials for the zincblende-type III-V compound semiconductor crystals 2 and 3, i.e., GaAs, InGaAs, InGaAsP, InAlAs, InP, GaP, GaSb, and AlSb, three materials, i.e., GaAs, InP, and GaP, were each analyzed to plot a dispersion curve of the group index $n_g$ versus the wavelength of the pump or sampling beam and a dispersion curve of the refractive index $n_{THz}$ in the terahertz region according to equations (2) and (3). The results are shown in FIGS. 2 to 4. FIG. 2 shows that $n_{THz}$ stabilizes at 3.6 at 3 THz or lower. The dispersion curve of $n_g$ shows that $n_g < n_{THz}$ when λps>1.35 μm. Thus, the phase condition is met when λps>1.35 μm. In other words, the zincblende-type III-V compound semiconductor crystals 2 and 3 shown in FIG. 1 may be composed of GaAs when the pump beam or the sampling beam has a wavelength of 1.35 μm or more.

Similarly, FIG. 3 shows that the semiconductor crystals 2 and 3 shown in FIG. 1 may be composed of InP when the pump beam or sampling beam has a wavelength of 1.2 μm or more. FIG. 4 shows that the semiconductor crystals 2 and 3 shown in FIG. 1 may be composed of GaP when the pump beam or sampling beam has a wavelength of 1.0 μm or more.

Figure 5:
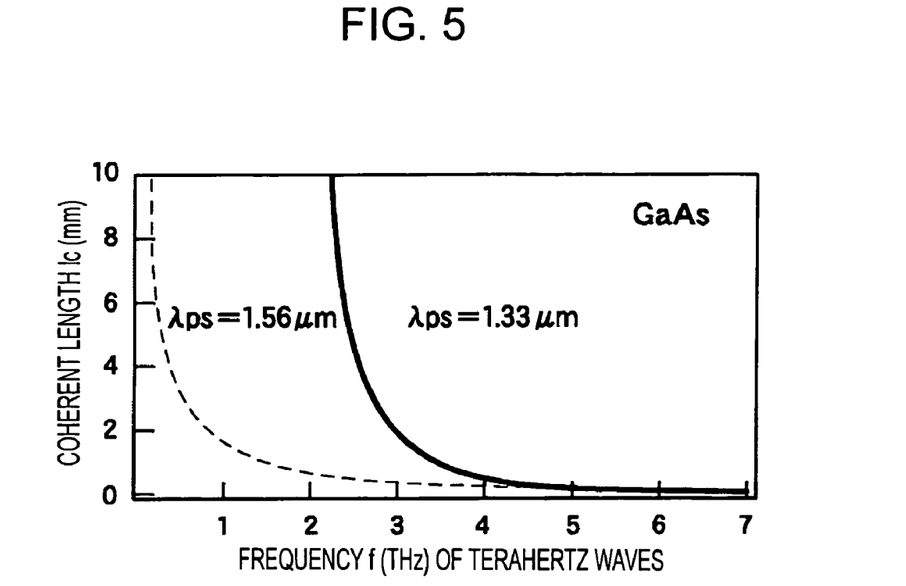
FIG. 5 is a graph showing the relationship between the coherent length of GaAs and the frequency of terahertz waves when the wavelength of the pump or sampling beam is 1.33 μm and 1.56 μm.
Figure 6:
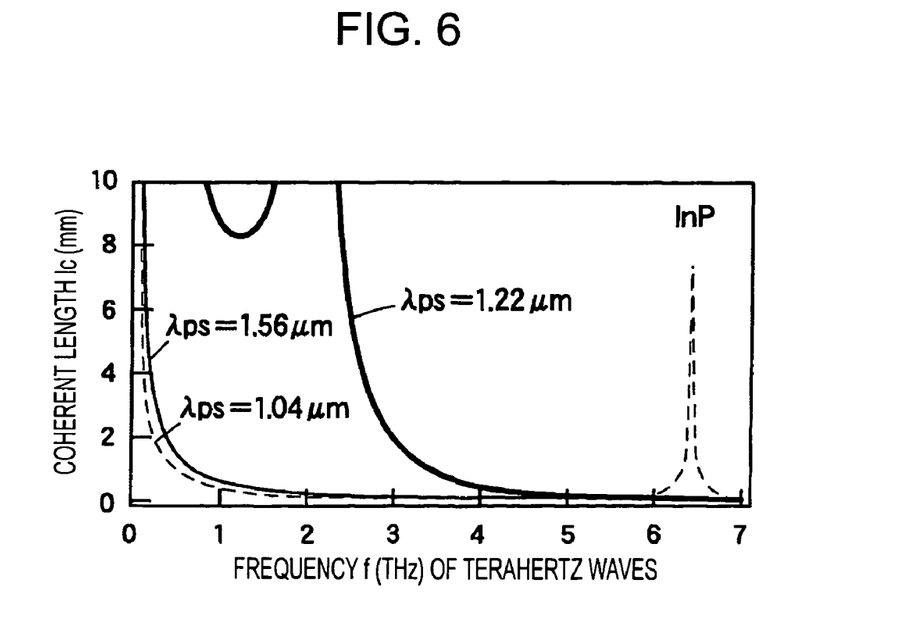
FIG. 6 is a graph showing the relationship between the coherent length of InP and the frequency of terahertz waves when the wavelength of the pump or sampling beam is 1.04 μm, 1.22 μm, and 1.56 μm.
Figure 7:
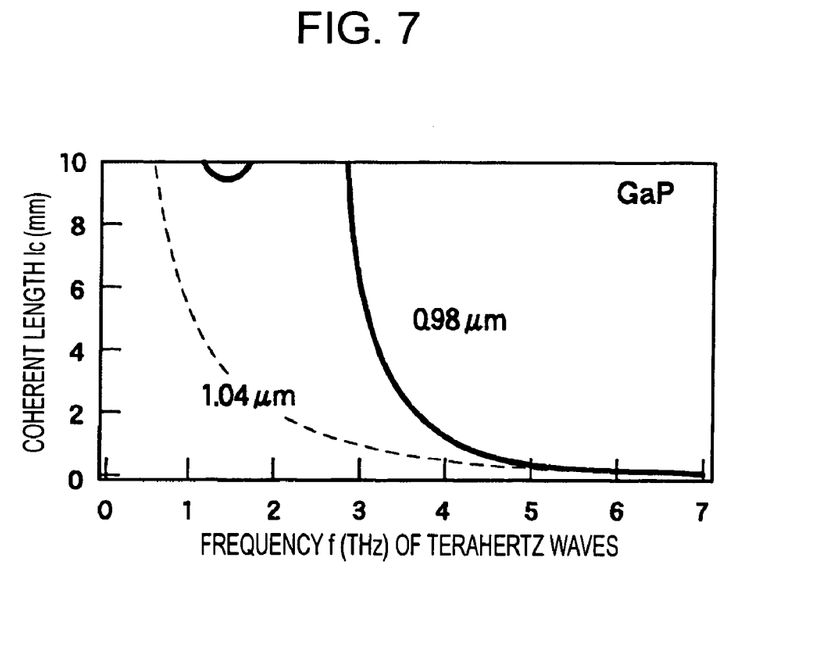
FIG. 7 is a graph showing the relationship between the coherent length of GaP and the frequency of terahertz waves when the wavelength of the pump or sampling beam is 0.98 μm and 1.04 μm.

Among the preferable materials for the zincblende-type III-V compound semiconductor crystals 2 and 3, i.e., GaAs, InGaAs, InGaAsP, InAlAs, InP, GaP, GaSb, and AlSb, three materials, i.e., GaAs, InP, and GaP, were each analyzed to determine the coherent length lc according to equation (1). The results are shown in FIGS. 5 to 7. FIG. 5 shows that a semiconductor crystal 2 composed of GaAs 2 mm in thickness will achieve phase matching up to 0.7 THZ for a 1.56 μm pump beam and up to 2.8 THz for a 1.33 μm pump beam. In other words, terahertz waves up to these frequencies can be respectively generated. FIG. 5 also shows that a semiconductor crystal 3 composed of GaAs 2 mm in thickness will achieve phase matching up to 0.7 THz for a 1.56 μm sampling beam and up to 2.8 THz for a 1.33 μm sampling beam. Thus, terahertz waves up to these frequencies can be respectively detected. In other words, FIG. 5 shows that the cutoff frequency of detectable terahertz waves when the semiconductor crystal 3 is composed of GaAs and has a thickness of 2 mm is 0.7 THz for a 1.56 μm sampling beam and is 2.8 THz for a 1.33 μm sampling beam. By changing the thickness of the semiconductor crystal, the cutoff frequency of the detectable terahertz waves can be adjusted.

Similarly, FIG. 6 shows that a semiconductor crystal 2 having a thickness of 1 mm and being composed of InP can generate terahertz waves up to 0.4 THz for a 1.04 μm pump beam, up to 0.75 THz for a 1.56 μm pump beam, and up to 3.5 THz for a 1.22 pump beam. For a 1.22 μm pump beam, a local minimum appears in the coherent length curve. By adjusting the thickness of the InP to a value close to the local minimum (up to 8 mm), 1.2 THz waves can be selectively generated. A semiconductor crystal 3 having a thickness of 1 mm and being composed of InP can detect terahertz waves up to 0.4 THz for a 1.04 μm sampling beam, up to 0.75 THz for a 1.56 μm sampling beam, and up to 3.5 THz for a 1.22 sampling beam.

FIG. 7 shows that a semiconductor crystal 2 having a thickness of 0.5 mm and being composed of GaP can generate terahertz waves of up to 4.5 THz for a 1.04 μm pump beam and up to 5.5 THz for a 0.98 μm pump beam. For a 0.98 pump beam, a local minimum appears in the coherent length curve. By adjusting the thickness of the GaP to a value close to the local minimum (up to 9.5 mm), 1.5 THz waves can be selectively generated. A semiconductor crystal 3 having a thickness of 0.5 mm and being composed of GaP can detect terahertz waves of up to 4.5 THz for a 1.04 μm sampling beam and up to 5.5 THz for a 0.98 sampling beam.

The semiconductor crystal 2 for generating terahertz waves and the semiconductor crystal 3 for detecting terahertz waves are preferably (110) crystals. Generation and detection can be efficiently carried out by utilizing the inversion symmetry of the nonlinear susceptibility $\chi^{(2)}$.

When the semiconductor crystals 2 and 3 are quasi-phase matching crystals, the frequency band of terahertz waves that can be generated or detected can be expanded. For example, the quasi-phase matching crystals can be produced as follows. In FIGS. 3 and 4, the regions marked by ellipses are each a region near the intersection of the group index $n_g$ curve and the leveled portion of $n_{THz}$ obtained by extrapolation, i.e., a region in which $n_g - n_{THz}$ is near 0. Quasi-phase matching is achievable with the wavelength (indicated by the abscissa) near these regions. For example, when GaP and InP are used near 1.04 μm, quasi-phase matching is possible since $n_g - n_{THz} < 0$ for GaP and since $n_g - n_{THz} > 0$ for InP. Accordingly, by alternately laminating GaP and InP, a quasi-phase matching crystal can be produced. The thickness of the laminate may be adjusted to the coherent length that corresponds to the frequency region for terahertz waves to be generated and detected. Lamination may be conducted by metalorganic chemical vapor deposition (MOCVD), molecular beam epitaxy (MBE), or the like.

The operation of the system will now be described. An ultrashort light pulse in the optical communication band generated from the light source 1 is split into a pump beam and a sampling beam with a beam splitter 11. The sampling beam is reflected at two mirrors 12 for bending the optical path, concentrated by the lens 44, and is applied to the zincblende-type III-V compound semiconductor crystal 3 through the hole in the perforated off-axis parabolic mirror 43.

The pump beam is reflected at the mirror 12 for bending the optical path, given a predetermined temporal delay at the optical delay line 41, concentrated with the lens 44, and is applied to the zincblende-type III-V compound semiconductor crystal 2. Once irradiated with the pump beam in the optical communication band, the semiconductor crystal 2 generates terahertz waves. The generated terahertz waves are collimated with the off-axis parabolic mirror 42, and concentrated and applied to the zincblende-type III-V compound semiconductor crystal 3 with the perforated off-axis parabolic mirror 43 so that the pump beam and the sampling beam are coaxial (spatial overlap). The predetermined time delay given by the optical delay line 41 is adjusted so that the sampling beam and the terahertz waves are simultaneously irradiates (temporal overlap) the semiconductor crystal 3.

The semiconductor crystal 3 irradiated with terahertz waves allows the polarized light of the sampling beam passing through the crystal to rotate due to the Pockels effect caused by the electric field signal. As a result, the sampling beam becomes elliptically polarized after it passed through the quarter wavelength plate 15. Accordingly, a difference in component is generated between the p-polarized light and the s-polarized light. The p-polarized light and the s-polarized light are split with the Wollaston prism 16 and detected with the optical detectors 17 and 17', which output different electrical signals. The difference between the electrical signals is in proportion to the electrical field of the terahertz waves applied to the semiconductor crystal 3. Thus, the electrical field of the terahertz waves can be determined from the electrical signals output from the optical detectors 17 and 17'. Note that the SN ratio of the signals can be increased by inserting an optical chopper in the light path of the terahertz waves and amplifying the electrical signals output from the optical detectors 17 and 17' with a lock-in amplifier.

In the embodiment shown in FIG. 1, the ultrashort light pulse in the optical communication band generated from the light source 1 propagates in air. However, use of optical fibers has become popular since optical fibers can transmit light in the optical communication band at low loss. Thus, modifications may be made to the system shown in FIG. 1 so that the pulse is transmitted through optical fibers from the light source 1 to the lens 14 and to the lens 44. The optical delay line 41 may also be constituted from optical fibers. In this manner, size-reduction and stable operation can be ensured.

EXAMPLES

Example 1

In EXAMPLE 1, a small fiber laser for emitting laser beams having a wavelength of 1.56 μm, a repetition frequency of 50 MHz, a pulse width of 100 fs, and an output of 380 mW was used as the light source 1 shown in FIG. 1. A (110) GaAs crystal having a thickness of 0.5 mm was used as the zincblende-type III-V compound semiconductor crystals 2 and 3.

Figure 8:
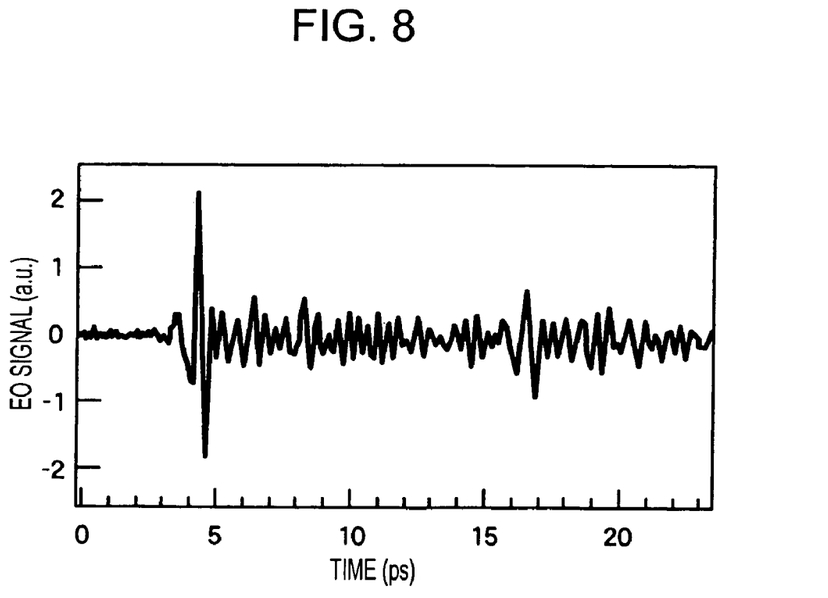
FIG. 8 is a graph showing the electrical field waveform of the terahertz waves obtained in EXAMPLE 1.
Figure 9:
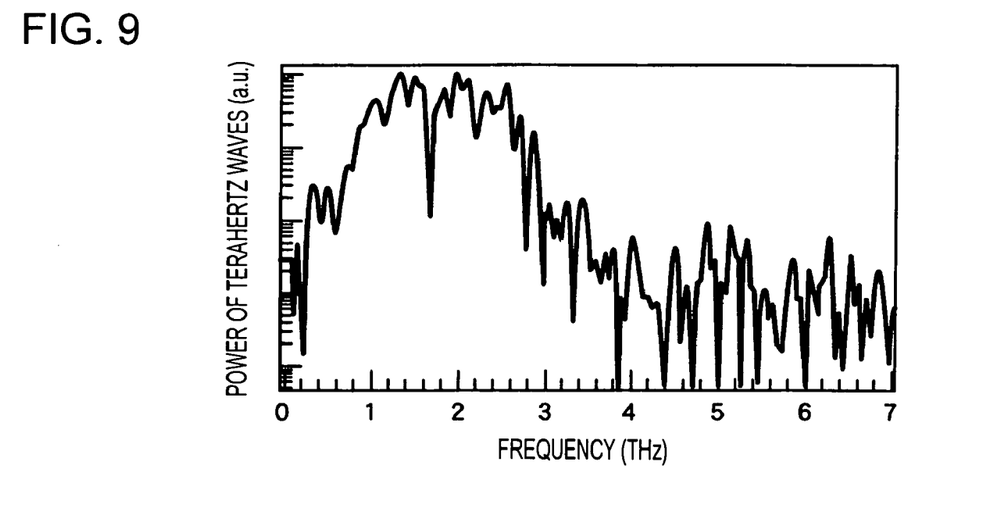
FIG. 9 is a power spectrum of the terahertz waves obtained by Fourier transform of the electrical field waveform shown in FIG. 8.

The electrical field signal waveform of the terahertz waves obtained in this example is shown in FIG. 8. A power spectrum of the terahertz waves obtained by Fourier transform of the electrical field signal waveform shown in FIG. 8 is shown in FIG. 9. Terahertz waves up to about 3 THz were generated and detected.

Example 2

Figure 10:
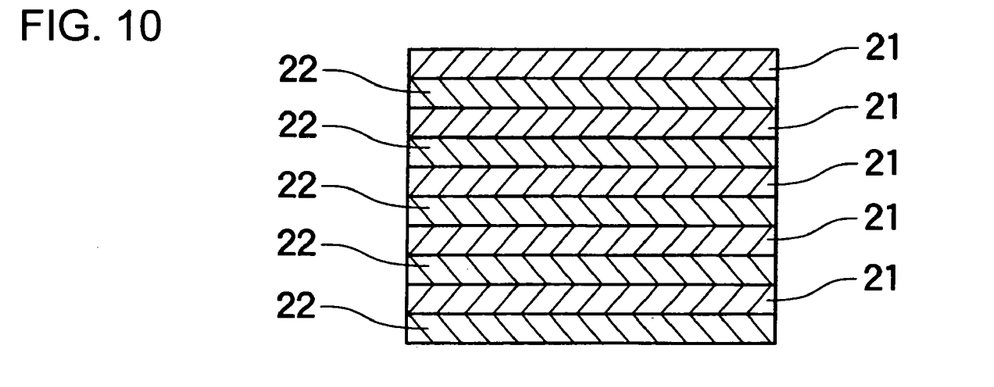
FIG. 10 is a cross-sectional view of a quasi-phase matching crystal for generating terahertz waves according to EXAMPLE 2.

In EXAMPLE 2, a small fiber laser for emitting laser beams having a wavelength of 1.04 µm, a repetition frequency of 50 MHz, a pulse width of 100 fs, and an output of 380 mW was used as the light source 1 shown in FIG. 1. The quasi-phase matching crystal shown in FIG. 10 and the quasi-phase matching crystal shown in FIG. 11 were used as the semiconductor crystals 2 and 3, respectively. The quasi-phase matching crystal (the semiconductor crystal 2) shown in FIG. 10 was constituted from a total of ten alternately stacked semiconductor layers 21 and 22. The semiconductor layers 21 were composed of a semiconductor crystal (P) in which the difference between the group index at the pump beam wavelength and the refractive index in the terahertz region was positive, and the semiconductor layers 22 were composed of a semiconductor crystal (N) in which the difference was negative. Each semiconductor layer 21 was composed of InP and had a thickness of 100 µm. Each semiconductor layer 22 was composed of GaP and had a thickness of 100 µm.

Figure 11:
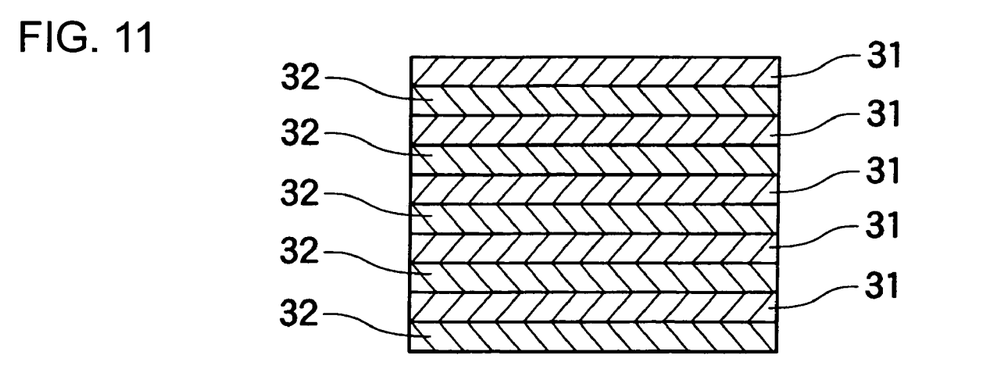
FIG. 11 is a cross-sectional view of a quasi-phase matching crystal for detecting terahertz waves according to EXAMPLE 2.

The quasi-phase matching crystal (the semiconductor crystal 3) shown in FIG. 11 was constituted from a total of ten alternately stacked semiconductor layers 31 and 32. The semiconductor layers 31 were composed of a semiconductor crystal (P') in which the difference between the group index at the pump beam wavelength and the refractive index in the terahertz region was positive, and the semiconductor layers 32 were composed of a semiconductor crystal (N') in which the difference was negative. Each semiconductor layer 31 was composed of InP and had a thickness of 100 µm. Each semiconductor layer 32 was composed of GaP and had a thickness of 100 µm.

Figure 12:
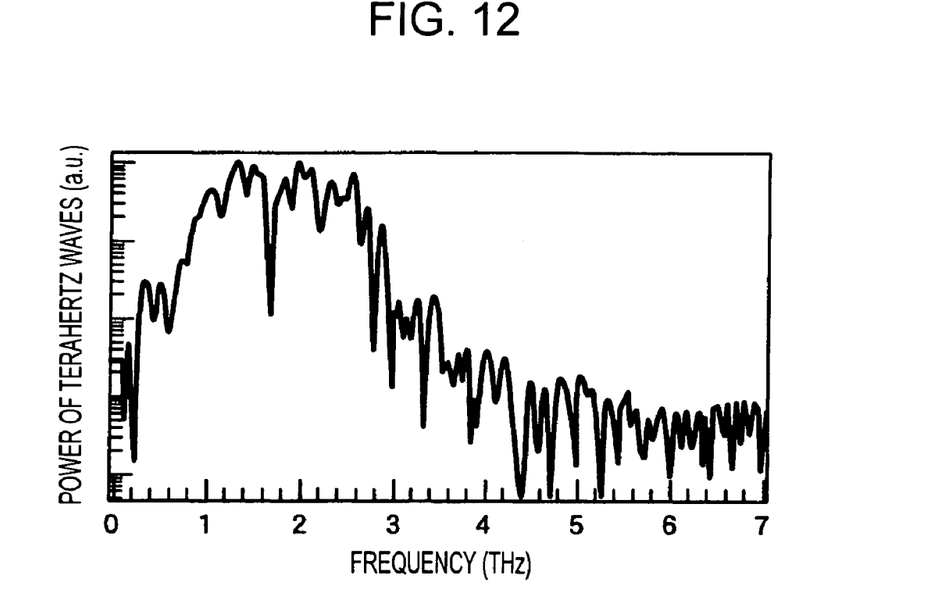
FIG. 12 is a power spectrum of the terahertz waves obtained in EXAMPLE 2.

FIG. 12 shows the power spectrum of the terahertz waves obtained in this EXAMPLE. Terahertz waves up to about 5 THz were generated and detected.

Example 3

In EXAMPLE 3, a small fiber laser for emitting laser beams having a wavelength of 1.22 µm, a repetition frequency of 50 MHz, a pulse width of 100 fs, and an output of 300 mW was used as the light source 1 shown in FIG. 1. An InP (110) crystal having a thickness of 8.5 mm was used as the zincblende-type III-V compound semiconductor crystal 2, and a GaAs (110) crystal having a thickness of 0.5 mm was used as the zincblende-type III-V compound semiconductor crystal 3.

Figure 13:
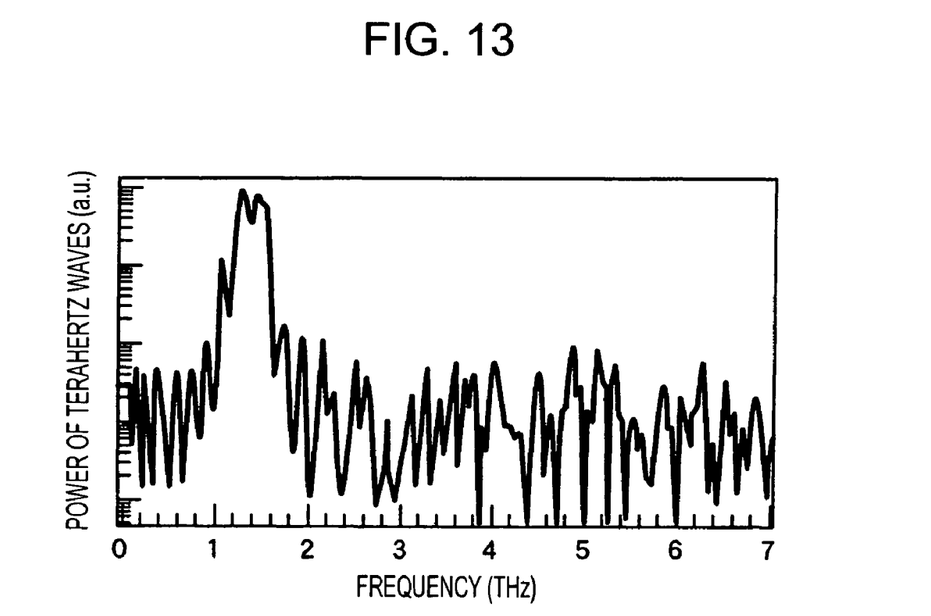
FIG. 13 is a power spectrum of the terahertz waves obtained in EXAMPLE 3.

The power spectrum of the terahertz waves obtained in this example is shown in FIG. 13. Terahertz waves in a narrow band ranging from 1 to 1.6 THz were selectively generated.

What is claimed is:

1. A terahertz wave-generating semiconductor crystal, comprising a zincblende-type III-V compound semiconductor crystal that generates terahertz wave pulses upon application of an ultrashort light pulse in the optical communication band serving as a pump beam, wherein
the zincblende-type III-V compound semiconductor crystal is one selected from the group consisting of GaAs, InGaAs, InGaAsP, InAlAs, InP, GaP, GaSb, and AlSb crystals,
the zincblende-type III-V compound semiconductor crystal is a quasi-phase matching crystal, and
the quasi-phase matching crystal comprises layers of a first semiconductor crystal and a second semiconductor crystal alternately stacked on each other, the first semiconductor crystal having a group index at the wavelength of the pump beam greater than the refractive index at the wavelength of the terahertz waves, the second semiconductor crystal having a group index at the wavelength of the pump beam smaller than the refractive index at the wavelength of the terahertz waves.

2. A terahertz wave generator comprising:
a light source for generating a pump beam which is an ultrashort light pulse in the optical communication band; and
a terahertz wave-generating semiconductor crystal comprising a zincblende-type III-V compound semiconductor crystal that has a predetermined thickness and generates terahertz wave pulses upon application of the pump beam generated from the light source, wherein
the zincblende-type III-V compound semiconductor crystal is one selected from the group consisting of GaAs, InGaAs, InGaAsP, InAlAs, InP, GaP, GaSb, and AlSb crystals,
the zincblende-type III-V compound semiconductor crystal is a quasi-phase matching crystal, and
the quasi-phase matching crystal comprises layers of a first semiconductor crystal and a second semiconductor crystal alternately stacked on each other, the first semiconductor crystal having a group index at the wavelength of the pump beam larger than the refractive index at the wavelength of the terahertz waves, the second semiconductor crystal having a group index at the wavelength of the pump beam smaller than the refractive index at the wavelength of the terahertz waves.

3. A terahertz wave-detecting semiconductor crystal, comprising:
a zincblende-type III-V compound semiconductor crystal that emits a modified sampling beam modified with an electrical field signal of a terahertz wave pulse upon temporal and spatial overlap irradiation with the terahertz wave pulse and an ultrashort light pulse in the optical communication band serving as a sampling beam, wherein
the zincblende-type III-V compound semiconductor crystal is one selected from the group consisting of GaAs, InGaAs, InGaAsP, InAlAs, InP, GaP, GaSb, and AlSb crystals,
the zincblende-type III-V compound semiconductor crystal is a quasi-phase matching crystal, and
the quasi-phase matching crystal comprises layers of a first semiconductor crystal and a second semiconductor crystal alternately stacked on each other, the first semiconductor crystal having a group index at the wavelength of the pump beam larger than the refractive index at the wavelength of the terahertz waves, the second semiconductor crystal having a group index at the wavelength of the pump beam smaller than the refractive index at the wavelength of the terahertz waves.

4. A terahertz wave detector comprising:
a terahertz wave-detecting semiconductor crystal comprising a zincblende-type III-V compound semiconductor crystal that emits a modified sampling beam modified with an electrical field signal of a terahertz wave pulse upon temporal and spatial overlap irradiation with the terahertz wave pulse and an ultrashort light pulse in the optical communication band serving as a sampling beam;

an irradiation unit that applies the terahertz wave pulse and the sampling beam to the zincblende-type III-V compound semiconductor crystal so that the terahertz wave pulse and the sampling beam temporally and spatially overlap each other; and an optical detector for detecting the sampling beam modified by an electrical field signal of the terahertz wave pulse and emitted from the zincblende-type III-V compound semiconductor crystal, wherein the zincblende-type III-V compound semiconductor crystal is one selected from the group consisting of GaAs, InGaAs, InGaAsP, InAlAs, InP, GaP, GaSb, and AlSb crystals, the zincblende-type III-V compound semiconductor crystal is a quasi-phase matching crystal, and the quasi-phase matching crystal comprises layers of a first semiconductor crystal and a second semiconductor crystal alternately stacked on each other, the first semiconductor crystal having a group index at the wavelength of the pump beam larger than the refractive index at the wavelength of the terahertz waves, the second semiconductor crystal having a group index at the wavelength of the pump beam smaller than the refractive index at the wavelength of the terahertz waves.

* * * * *